Patented Sept. 26, 1922.

1,430,017

UNITED STATES PATENT OFFICE.

PETER KREBITZ, OF MUNICH, GERMANY.

PROCESS FOR THE REMOVAL OF SOAP CONTAINED IN THE SLUDGE OF CARBONATE OF LIME.

No Drawing.  Application filed June 15, 1921.  Serial No. 477,787.

*To all whom it may concern:*

Be it known that I, PETER KREBITZ, citizen of Germany, residing at Munich, Bavaria, Germany, have invented certain new and useful Improvements in the Process for the Removal of Soap Contained in the Sludge of Carbonate of Lime (for which I have filed application in Germany, Apr. 21, 1920); and I do hereby declare the following to be a full, clear, and exact description of the invention such as will enable others skilled in the art to which it appertains to make and use the same.

This invention relates to an improved process for effecting the complete removal of any soap contained in the sludge of carbonate of lime.

The complete removal of soap remaining in the sludge of the carbonate of lime resulting from the treatment of lime-soap with a soda-solution after separation of the soap by salt (the Krebitz-process) was heretofore impossible except in the case where not less than twenty-five per cent of cocoa-nut or palm-seed oil had been saponified in the original soap-mixture. If the latter consisted of animal fat, hardened fish-oil and other oils, as palm-oil, vegetable tallow or liquid oils, as olive-oil, sulfur-oil, cottonseed-oil, in fact of any greases and oils of which alkali-soaps, when thinned with water, would strongly hydrolyze, without any larger addition of cocoa-nut oil, the remaining carbonate of lime, though still containing soap, could hardly be removed, and this only by elutriation with hot water or with a very weak solution of salt, about one per cent of soap remaining still unreleased. Filtration or centrifugalization would fail entirely with the sludge mentioned.

Prior to the war, when oils and greases were cheap, this loss of soap was easily compensated by the larger yield of glycerine and by a better appearance of the soap. With the extraordinary rise of prices of greases and oils this compensation has ceased. Moreover, the removal of the soap contained in the lime-sludge from greasy mixtures without any or with but little cocoa-nut oil, or palm seed oil would require very much hot water, in addition to involving a loss of one or two per cent of soap, and a dry cake of carbonate of lime was not attainable. For these reasons the advantages of the process referred to, though giving plenty of glycerine and an unobjectionable soap, were greatly impaired.

Now, the object of my invention is to recover the residual soap from the carbonate of lime sludge which results from adding salt to the original soap mixture which contained little or no cocoa-nut or palm-seed oil, and I accomplish this object by adding to the sludge one to six per cent of cocoa-nut oil soap or palm-seed oil soap. By this addition of cocoa-nut oil soap or palm-seed oil soap the entire soda-soap contained in the lime-sludge is dissolved easily and speedily, when treated with hot or boiling water; it permits of a clean filtering-off from the said carbonate of lime and of an entire lixiviation of the lime-cakes, the result being a soapless, fairly dry carbonate of lime. This process accordingly permits the using up in the Krebitz-process of any grease present. While heretofore at least twenty-five to forty-five per cent of cocoa-nut oil or palm-oil were required in the original soap-mixture, by my invention but one to six per cent of cocoa-nut soap or palm-seed oil soap in the sludge will be sufficient.

In default of cocoa-nut or palm-seed oil soap an addition of one to six per cent of saponified resin to the soap-containing sludge of carbonate of lime will cause almost as effective soap recovery by the filtration and lixiviation of the cakes.

The following examples of carrying out my invention will facilitate its understanding.

1. To 4500 weight-units of sludge of carbonate of lime containing soap resulting from the treatment of lime-soap with soda from a soap mixture containing no cocoa-nut or palm-oil soap add 90 parts of cocoa-nut or palm-seed oil soap and water or a very weak salt-water in such quantity as may be required for the solution of the entire soap present and for the elution of the carbonate of lime, thoroughly agitate the mixture or boil for a short time. After settling a clear solution of soap will separate and appear on top. In this case the sludge containing the soap has been elutriated with a sufficient quantity of water and is ready for filtration and for the lixiviation of the lime-cakes in the filter-process.

2. To 4500 parts of sludge of lime resulting from the treatment of tallow-lime-soap with soda-solution add 200 parts of cocoa-soap and water or weak salt-water, the further treatment being as set forth under 1.

3. To 4000 parts of sludge of lime resulting from the treatment of sulfur-oil-lime-soap with soda-solution add 100 parts of cocoa-nut oil or palm-seed oil and water until the soap dissolves, the further treatment being as set forth under 1.

4. To 4500 parts of sludge of lime resulting from the treatment of lime-soap of the fat of bones with soda-solution add 150 parts of palm-seed oil soap or cocoa-nut soap and water until sufficient for elution, the further treatment being as set forth under 1.

5. To 4500 parts of sludge of lime resulting from the treatment of palm-oil lime-soap with soda-solution add 150 parts of saponified resin or 150 parts of cocoa-soap and water until sufficient for elution, the further treatment being as set forth under 1.

The term "glue-fat-soap" as hereinafter used in the claims is a generic designation for cocoa-nut oil soap and palm-seed oil soap.

I claim:—

1. The herein described process of recovering residual soap from carbonate of lime sludge, which consists in adding to the sludge a glue-fat-soap equal in quantity to from one to six per cent of the sludge.

2. The herein described process of recovering residual soap from carbonate of lime sludge, which consists in adding to the sludge cocoa-nut oil soap equal in quantity to from one to six per cent of the sludge.

In testimony whereof I hereunto affix my signature in the presence of two witnesses.

PETER KREBITZ.

Witnesses:
 PAUL DREY,
 RICHARD LUTZ.